Jan. 27, 1959  B. ROGGE  2,870,881
BLIND JOINT—INTERNAL TYPE LOCKING
Filed Aug. 3, 1954
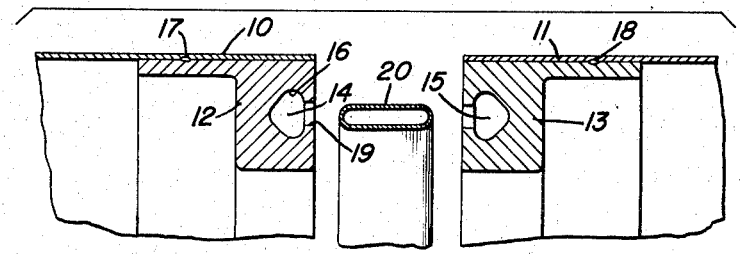
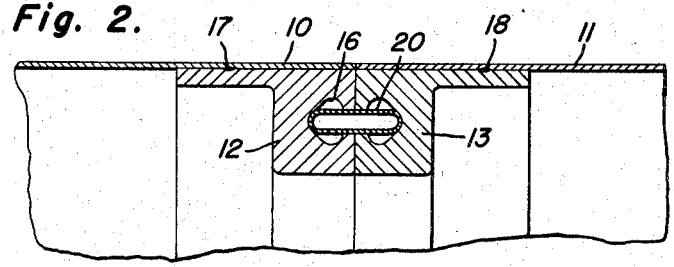
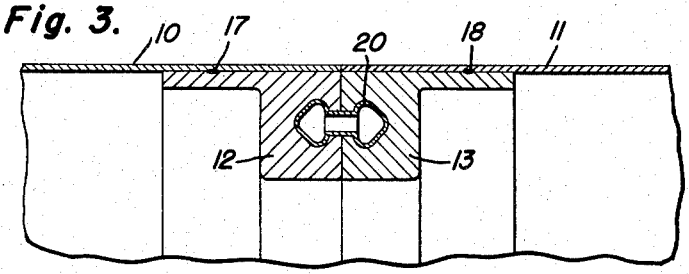
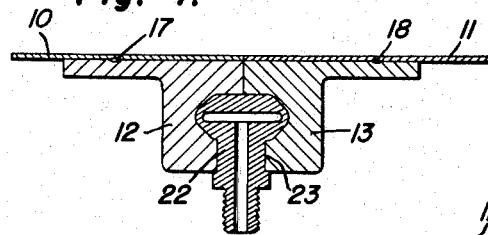
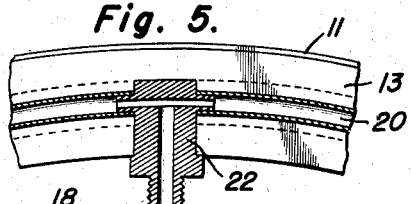
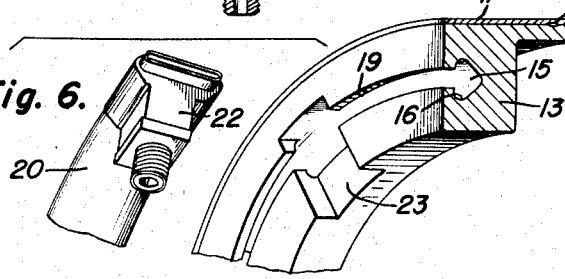
INVENTOR.
Bernhard Rogge
BY
ATTORNEY

United States Patent Office 2,870,881
Patented Jan. 27, 1959

2,870,881

BLIND JOINT-INTERNAL TYPE LOCKING

Bernhard Rogge, Baldwin, Md.

Application August 3, 1954, Serial No. 447,690

3 Claims. (Cl. 189—36)

(Granted under Title 35, U. S. Code (1952), sec. 266)

The invention described herein may be manufactured and used by or for the Government of the United States of America for governmental purposes without the payment to me of any royalties thereon.

This invention relates to a joint for sheet metal structures where it is desired to have a smooth outer surface to the joined sheets. More particularly, it relates to a joint between two sheet metal sections which are held together by means of a third element to form the joint.

Specifically, the invention relates to sheet metal structures having a flanged end attachment with an undercut recess in said flange section. These recesses are positioned adjacent each other and are held together by means of flattened hollow tubing extending into the opposite recesses in the two flanges. After being positioned in this manner the hollow tubing is expanded by hydraulic pressure to conform to the enlarged undercut recess in each flange, thereby effectively holding the two flanges and the attached sheets together.

In the drawings, Fig. 1 shows sections of two sheet metal cylinders 10 and 11 to which are attached the recessed flanges 12 and 13 respectively. These flanges have longitudinal recesses 14 and 15 which are undercut within the flange as shown at 16. This results in the opening into the recess being of smaller diameter than the inner cavity. To complete the joint, a flattened pipe section 20 is provided which is of such size that it will pass through the openings into the flanged recesses as shown in Fig. 2. The flange sections 12 and 13 may be made of a suitable metal such as aluminum and may be produced by casting or machining. The flange sections are attached to the sheet metal pipe sections by spot welding as shown at 17 and 18.

Fig. 2 shows the two pipe sections in position with the flattened pipe section inserted between the two cavities. Fig. 3 shows the same sectional view after the pipe section has been hydraulically expanded. The sections illustrated in Figs. 1, 2 and 3 are cylindrical, but it is to be understood that the same method may be used with equal facility in joining flat sheet metal sections. In the latter instance, the channel sections may be extruded instead of cast.

Figs. 4, 5 and 6 show details of the flattened pipe sections and the means of applying hydraulic pressure thereto. In this case, the pipe section is bent into a ring and equipped with a hydraulic fitting 22 which provides the means for applying hydraulic pressure to the tubing. Figs. 4 and 5 show a transverse and longitudinal section of the hydraulic fitting respectively, whereas Fig. 6 shows a perspective view of the fitting 22 and recess 23 in the flange 13, which serves to provide an outlet for the fitting.

After the flat pipe section is expanded and the joint is completed, the hydraulic fluid used to expand the joint may be allowed to drain out since the expanded pipe section (Fig. 3) will resist any reasonable pressure to separate the joint. Due to the relatively sharp corners 19 of the recesses, the pressure required to separate the joint can readily be made as great as the tensile strength of the sheet metal. Instead of draining the hydraulic fluid from the pipe section, it may be sealed therein after the expansion is complete. In like manner, the pipe section may be filled with a low melting point metal, a thermoplastic resin or any other substance that can be introduced in a fluid state and which may subsequently take on the shape of the expanded section through partial or complete hardening. This filling of the expanded pipe section serves to strengthen the joint and makes it possible to use lighter metal in the section.

This joint is especially useful in joining sections of airplane structures, bombs and other aerodynamic structures where the outside surface should be as smooth as possible. Moreover, when the parts are assembled by means of this joint, there is a tendency to pull the flanges together with great force due to the undercut recesses. A joint made by this method can be made fluid tight because of the continuous tension obtaining along the entire seam.

I claim:

1. A joint structure for sheet metal comprising two opposed flange sections attached to each of two metal sheets, opposed coinciding undercut channels in each of said flange sections, a hollow, shaped tubing, tightly connecting and filling both of said channels by being hydraulically expanded therein.

2. A joint structure in accordance with claim 1 wherein the shaped tubing has been expanded hydraulically from a flat section and wherein the hydraulic fluid is sealed in the tubing.

3. A joint structure in accordance with claim 1 wherein the shaped tubing is filled with a low melting metal.

References Cited in the file of this patent

UNITED STATES PATENTS

| | | |
|---|---|---|
| 2,088,909 | Jaubert | Aug. 3, 1937 |
| 2,257,001 | Davis | Sept. 23, 1941 |
| 2,306,990 | Essl | Dec. 29, 1942 |

FOREIGN PATENTS

| | | |
|---|---|---|
| 494,402 | Great Britain | Oct. 25, 1938 |